(12) United States Patent
DiGangi et al.

(10) Patent No.: US 7,393,008 B2
(45) Date of Patent: Jul. 1, 2008

(54) PRESSURE WAVE GAS GENERATOR

(75) Inventors: Joseph Scott DiGangi, Knoxville, TN (US); James Michael Rose, Knoxville, TN (US); Robert William Rovito, Knoxville, TN (US); John Keller, Knoxville, TN (US); Clarence Richard Husband, Jr., Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 101 days.

(21) Appl. No.: 10/678,305

(22) Filed: Oct. 6, 2003

(65) Prior Publication Data

US 2005/0073138 A1 Apr. 7, 2005

(51) Int. Cl.
*B60R 21/26* (2006.01)

(52) U.S. Cl. .................. 280/737; 280/740; 280/741

(58) Field of Classification Search ............. 280/736, 280/737, 740, 741
See application file for complete search history.

(56) References Cited

U.S. PATENT DOCUMENTS

| | | | |
|---|---|---|---|
| 5,263,740 A | | 11/1993 | Frey et al. |
| 5,607,181 A | * | 3/1997 | Richardson et al. ......... 280/737 |
| 5,673,933 A | * | 10/1997 | Miller et al. ................ 280/736 |
| 5,762,368 A | * | 6/1998 | Faigle et al. ................ 280/737 |
| 5,836,610 A | * | 11/1998 | Rink et al. .................. 280/736 |
| 5,884,938 A | * | 3/1999 | Rink et al. .................. 280/741 |
| 5,941,562 A | * | 8/1999 | Rink et al. .................. 280/737 |
| 5,964,479 A | * | 10/1999 | Rink et al. .................. 280/741 |
| 5,979,936 A | * | 11/1999 | Moore et al. ................ 280/736 |
| 6,098,548 A | * | 8/2000 | Rink et al. .................. 102/531 |
| 6,273,462 B1 | * | 8/2001 | Faigle et al. ................ 280/737 |
| 6,286,864 B1 | * | 9/2001 | Green et al. ................ 280/741 |
| 6,364,355 B1 | * | 4/2002 | Starozhitsky et al. ....... 280/741 |
| 6,805,376 B2 | * | 10/2004 | Mizuno ...................... 280/737 |
| 7,032,925 B2 | * | 4/2006 | Iwai et al. ................... 280/737 |
| 2003/0116949 A1 | | 6/2003 | Mizuno |

\* cited by examiner

*Primary Examiner*—Toan To
(74) *Attorney, Agent, or Firm*—Nixon & Vanderhye, PC

(57) ABSTRACT

A gas generator comprising a pressure vessel containing a gas under a first predetermined pressure. An initiator housing closes one end of the pressure vessel and has an opening at the inner end thereof that is closed by an initiator rupture disk constructed to rupture at a second predetermined pressure in the initiator housing greater than the first predetermined pressure. A micro-gas generator or initiator is disposed within the initiator housing. A manifold closes the other end of the pressure vessel and has an opening at the inner end thereof closed by a manifold rupture disk constructed to rupture at a third predetermined pressure greater than the first predetermined pressure. Upon the firing of the micro-gas generator or initiator, the gas pressure in the initiator housing increases to or exceeds the second predetermined pressure to rupture the initiator rupture disk and create a pressure wave that travels through the pressure vessel to create a localized pressure at the manifold rupture disk that equals or exceeds the third predetermined pressure to rupture the manifold rupture disk and allow flow of cool pressurized gas through the manifold before the gas in the pressure vessel is significantly heated and pressurized by the gas flow from the initiator housing.

1 Claim, 3 Drawing Sheets

Figure 13.0 Typical Pressure Wave Results

Figure 14.0 Typical Pressure Wave at the Manifold Rupture Disk (Delta P above fill pressure)

PRESSURE WAVE GAS GENERATOR

BACKGROUND OF THE INVENTION

1. Field of the Invention

The present invention relates to a gas generator which may be used to inflate an automotive airbag or other safety restraint, and for providing gas under pressure to a device to be pressurized in other applications. More particularly, the present invention relates to such a gas generator that creates a pressure wave.

2. Description of the Related Art

U.S. Pat. No. 6,273,462 discloses an airbag inflator having a container for defining a chamber containing gas under pressure. The container includes a rupturable container wall or rupture disk which is rupturable to provide a gas exit through which gas flows outwardly from the chamber. The inflator includes means for producing a shock wave in the gas under pressure which ruptures the rupturable wall or disk. The shock wave producing means is spaced apart from the rupturable wall or disk and preferably is an igniter or detonator which is exposed to the chamber. The igniter creates a shock wave impulse that causes the rupturable wall or disk to rupture prior to the pressure in the container reaching the predetermined level at which the wall or disk is designed to rupture.

As specifically stated in the specification of U.S. Pat. No. 6,273,462, the rupturable disk was designed to rupture when the pressure in the inflator reached a predetermined level of 5,000 psi. The container was pressurized to an initial level of 1,054 psi, as can be seen at time 0 on the graph in FIG. 4. The activation of the igniter produced a shock wave in the gas in the container and increased the pressure in the container. The pressure in the container reached a maximum second level of 2,983.1 psi at 1 ms. The rupturable disk ruptured when the pressure in the container reached the second level which was much less than the predetermined level of 5,000 psi.

The inflator disclosed in U.S. Pat. No. 6,273,462 is subject to one or more of the following disadvantages:

1. The low fill pressure of the container does not optimize moles of gas relative to package size;
2. The rupturable wall or disk must be weakened to enable it to rupture at a pressure less than that at which it is designed to rupture; and
3. The igniter or detonator is exposed to the gas under pressure in the container and thus does not generate a high pressure wave for rapidly rupturing the rupturable disk at its design pressure before the gas in the container is heated to raise its average surrounding pressure to the design pressure of the rupturable wall or disk.

SUMMARY OF THE INVENTION

The present invention is a new and improved pressure wave gas generator for inflating an automotive airbag or other safety restraint, or for providing gas under pressure to a device to be pressurized in other applications. The gas generator comprises a pressure vessel filled with a gas under pressure, such as an argon/helium or nitrogen/helium mixture, at a nominal pressure of approximately 4,000-8,000 psi, e.g., 7,000 psi, to optimize moles of gas relative to inflator or other package size. A manifold is provided at one end of the pressure vessel and is separated from the gas under pressure therein by a manifold rupture disk. A micro-gas generator or initiator is located in a housing at the other end of the pressure vessel that is separated from the gas in the pressure vessel by an initiator rupture disk.

In operation, a firing signal is sent to the micro-gas generator or igniter which ignites the pyrotechnic material therein to generate heat and gas to increase the pressure in the initiator housing to cause the initiator disk to rupture at a predetermined pressure that is significantly higher than the pressure of the gas in the pressure vessel. This pressure differential causes a pressure wave to propagate through the stored gas in the pressure vessel after the rupture of the initiator disk. The pressure wave reflects off the manifold rupture disk to generate a localized pressure to rupture the manifold disk and allow gas flow through the manifold. The average pressure of the gas in the pressure vessel is below the rupture pressure of the manifold rupture disk pressure for the reason that the gas has not been heated to the rupture pressure of the manifold disk. In this manner, high pressure, cold gas, (e.g., less than 21° C.) is directed through the openings in the manifold to the device to be inflated or pressurized. The manifold may be constructed to direct the gases exiting therefrom in an axial and/or radial direction.

The new and improved pressure wave gas generator of the present invention possesses many advantages over gas generators disclosed in the prior art, some of which are as follows:

1. It is simple in construction;
2. It is low cost and easy to manufacture;
3. It utilizes the latest lightweight materials to optimize and reduce overall size and weight;
4. It utilizes a common initiator or micro-gas generator housing assembly that can be used with a range of pressure vessel sizes;
5. It provides a large manifold flow area to achieve rapid release of gas;
6. It provides a high fill pressure to optimize moles of gas relative to inflator or other package size;
7. It provides cold pressurized gas through the manifold to an airbag cushion or other safety restraint to maximize up time for rollover events or the like.
8. It provides for radial and/or axial flow from the manifold; and
9. The use of a micro-gas generator provides heat to compensate for the cooling effect of expansion to allow gases such as argon and nitrogen to be used in the pressure vessel.

DESCRIPTION OF THE PREFERRED EMBODIMENTS

Figure 1:
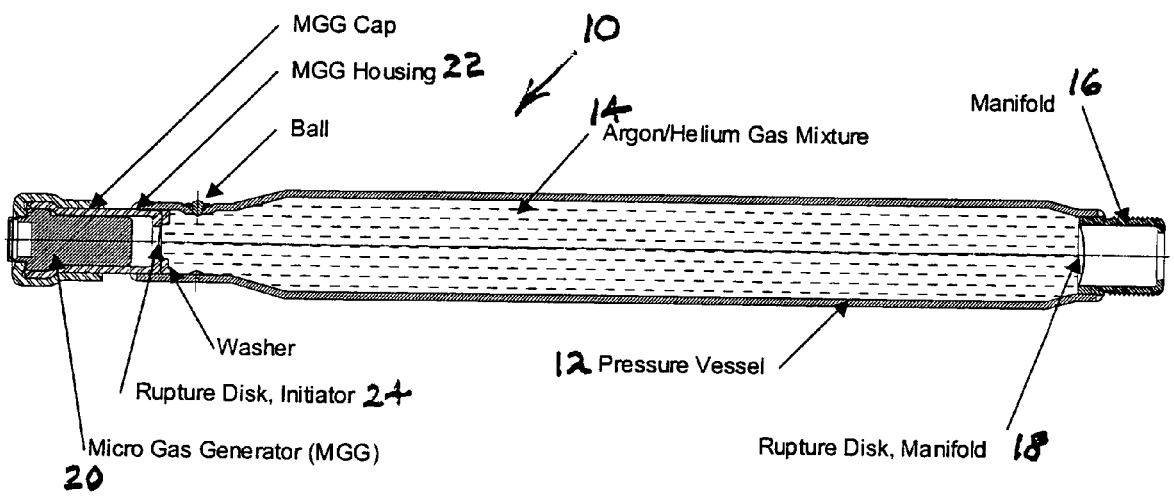
FIG. 1 is a side elevational view in section of one embodiment of a gas generator constructed in accordance with the principles of the present invention.

In one embodiment as shown in FIG. 1, the gas generator 10 of the present invention comprises a pressure vessel 12 filled with a gas mixture 14 under pressure, such as an argon/helium or nitrogen/helium gas mixture at a first predetermined pressure of approximately 4,000-8,000 psi; e.g., 7,000 psi, to optimize moles of gas relative to the size of the inflator or other device to be inflated or pressurized. The pressure vessel 12 may be formed of any suitable lightweight, high strength material such as a low carbon steel, aluminum or the like.

A manifold 16 of any suitable construction is secured in any suitable manner, such as by welding, to one end of the pressure vessel 12 and comprises at the inner end thereof a manifold rupture disk 18 formed of any suitable material, such as inconel which separates the manifold from the gas mixture 14 under pressure in the pressure vessel 12. The manifold 16 may be constructed for radial and/or axial gas flow therethrough, and is adapted to be operatively connected to a device to be inflated or pressurized, such as an inflatable airbag (not shown). The manifold rupture disk is constructed to rupture at a suitable or desired pressure depending on design requirements and materials used, such as approximately 1.8 times the first predetermined pressure in the pressure vessel 12.

A micro-gas generator or initiator 20 is located in a housing 22 secured to the other end of the pressure vessel 12 in any suitable manner, such as by welding. The inner end of the housing 22 comprises an initiator rupture disk 24 which separates the micro-gas generator or initiator 20 from the gas mixture 14 in the pressure vessel 12. The use of a micro-gas generator is advantageous in that it provides heat to compensate for the cooling effect of expansion to allow gases such as argon and nitrogen to be used in the gas mixture in the pressure vessel.

In operation, a firing signal is sent to the micro-gas generator or igniter 20 to ignite the pyrotechnic material therein and generate heat and gas to increase the pressure in the initiator housing 22 to cause the initiator disk 24 to rupture at a second predetermined pressure that is significantly higher than the pressure of the gas mixture 14 in the pressure vessel 12. As an illustrative example, the initiator rupture disk 24 may be constructed to rupture at a second predetermined pressure approximately two times higher than the pressure of the argon/helium or nitrogen/helium gas mixture 14 in the pressure vessel 12. This pressure differential causes a pressure wave to propagate through the stored gas mixture in the pressure vessel 12 when the initiator disk 24 ruptures. The pressure wave reflects off the manifold rupture disk 18 to create a localized pressure at the manifold rupture disk that equals or exceeds the third predetermined pressure at which the manifold rupture disk 18 is designed to rupture.

The rupture of the manifold rupture disk 18 allows the gas under pressure in the pressure vessel 12 to flow through the manifold 16 to the device to be inflated or pressurized, such as an automotive airbag (not shown). It is noted that the average pressure of the gas mixture 14 in the pressure vessel 12 at the time of rupture of the manifold rupture disk 18 is below the manifold disk rupture pressure for the reason that the gas has not been heated to the rupture pressure. Accordingly, high pressure, cold gas (e.g., less than 21° C.) is directed through the manifold 16. The heat from the gas generated by the micro-gas generator 20 is used to ensure that the gas components, such as argon or nitrogen, in the gas mixture 14 in the pressure vessel 12 do not liquefy during the operation. The manifold 16 may be constructed to direct the gases exiting therefrom in an axial and/or radial direction.

Because of the initiator housing 22 for the micro-gas generator or initiator 20, a high pressure is generated in the housing 22 that is significantly higher than that of the gas mixture 14 in the pressure vessel 12. Upon the rupture of the initiator rupture disk 24, therefore, the pressure differential creates a pressure wave that rapidly generates a localized pressure at the manifold rupture disk 18 to rupture it and allow gas flow through the manifold 16. The rupture of the manifold disk 18 before the gas mixture in the pressure vessel is significantly heated and pressurized by the gas flowing through the initiator disk 24 allows cool, pressurized gas to enter the manifold 18 and the device to be inflated or pressurized. This is particularly advantageous in the case of an airbag where a cooler inflation gas provides for a maximum up time for rollover events and the like.

Figure 2:
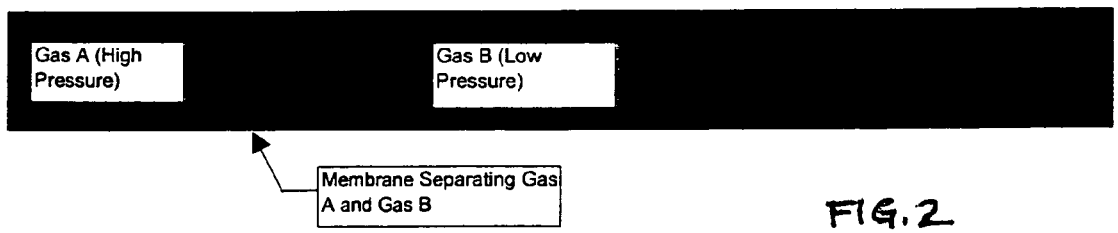
FIG. 2 is a schematic view of the gas generator illustrating its state of operation prior to initiator disk rupture.
Figure 3:
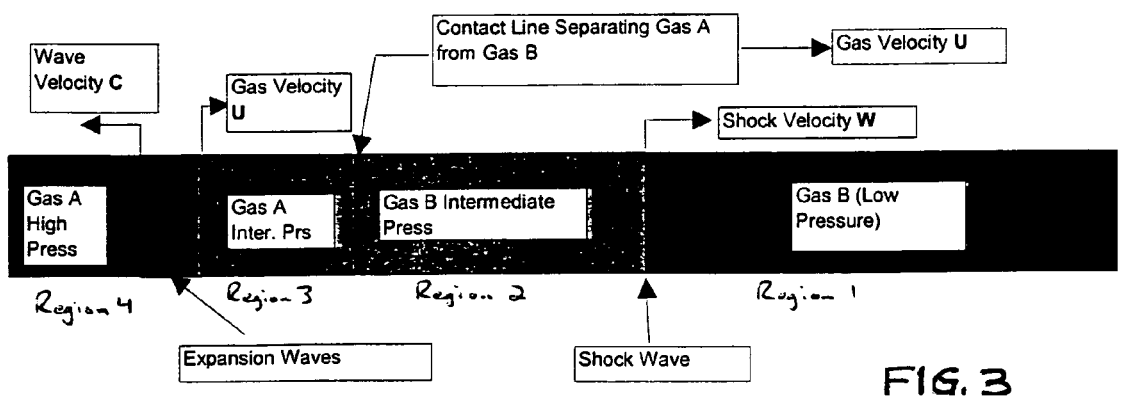
FIG. 3 is a schematic view of the gas generator illustrating its state of operation after rupture of the initiator disk.
Figure 4:
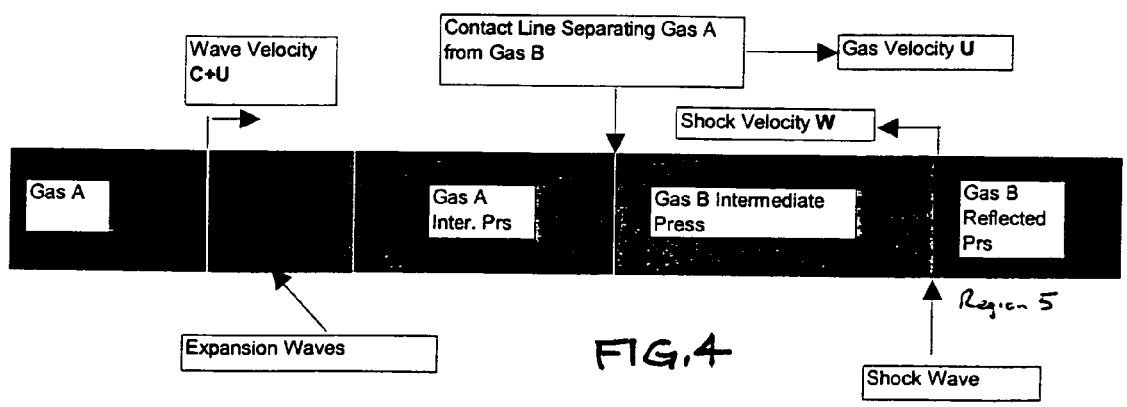
FIG. 4 is a schematic view of the gas generator illustrating its state of operation after the engagement of the pressure wave with the rupturable manifold disk.

FIGS. 2, 3 and 4 are schematic views of the gas generator in different states of operation which illustrate the general pressure wave theory that supports the operation of the present invention which can be found in numerous textbooks. For example, the following information is in "Elements of Gasdynamics" by H. W. Liepmann and A. Rashko, Galcit Aeronautical Series, 1957:

$$\frac{p^4}{p^1} = \frac{p^2}{p^1}\left[1 - \frac{(\gamma_4 - 1)(a_1/a_4)(p_2/p_1 - 1)}{\sqrt{2\gamma_1}\sqrt{2\gamma_1 + (\gamma_1 + 1)(p_2/p_1)}}\right]^{-2\gamma_4/(\gamma_4-1)}$$

Where:
$p_4$=high pressure of generator gas A in Region 4
$p_1$=low pressure of fill gas B in Region 1
$p_2$=intermediate pressure of fill gas B in Region 2
"a1"=speed of sound of fill gas B
"a4"=speed of sound of generator gas A
"γ4"=specific heat ratio of generator gas A
"γ1"=specific heat ratio of fill gas B And from "The Dynamics and Thermodynamics of Compressible Fluid Flow, Vol. 2", by Ascher H. Shapiro, John Wiley, 1954:

$$\frac{p_5}{p_1} = \frac{p_2}{p_1}\left[\frac{\left(1 + 2\frac{\gamma_1 - 1}{\gamma_1 + 1}\right)\frac{p_2}{p_1} - \frac{\gamma_1 - 1}{\gamma_1 + 1}}{\frac{\gamma_1 - 1}{\gamma_1 + 1}\frac{p_2}{p_1} + 1}\right]$$

Where:
$p_5$=reflected pressure, fill gas B in Region 5.

Figure 5:
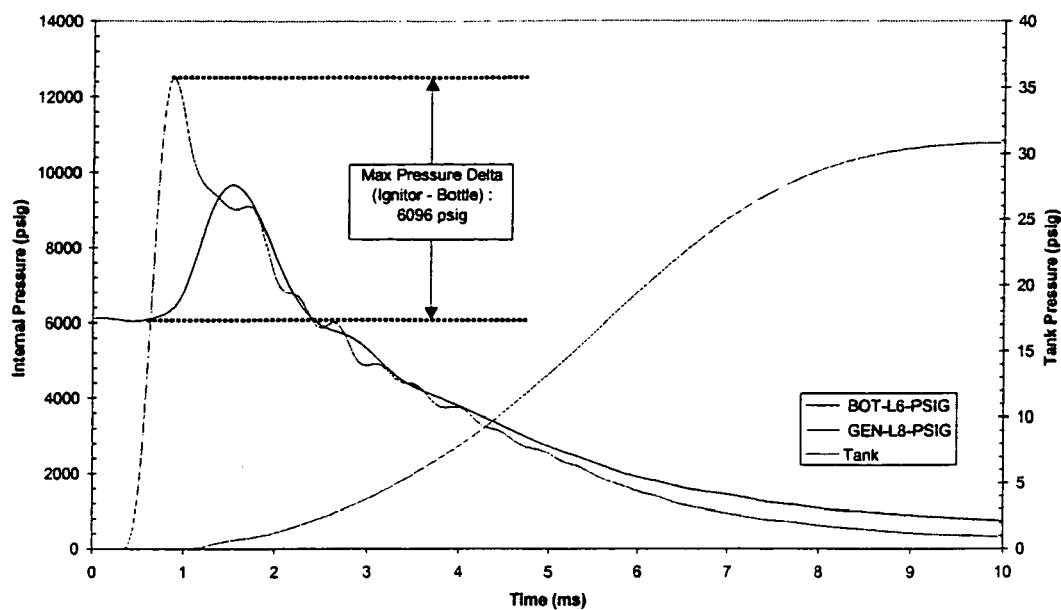
FIG. 5 is a graphical representation of the micro-gas generator or initiator housing pressure, pressure vessel or bottle pressure and inflator or tank pressure resulting from a typical application of the gas generator of the present invention as tested in suitable test hardware.

FIG. 5 illustrates graphically the micro-gas generator or initiator housing pressure, the pressure vessel or bottle pressure and the tank (inflator or other device) pressure of a typical application of the invention in a test configuration. In this test, the initiator rupture disk was constructed to open at a delta pressure (housing pressure-pressure vessel pressure) of approximately 6,000 psi. The manifold rupture disk was constructed to open at approximately 11,000 psi. After the micro-gas generator or initiator is fired at 0.0 milliseconds, the micro-gas generator or initiator housing pressure increases to rupture the initiator rupture disk. The delta pressure creates the pressure wave which travels the length of the pressure vessel or bottle to the manifold rupture disk.

Figure 6:
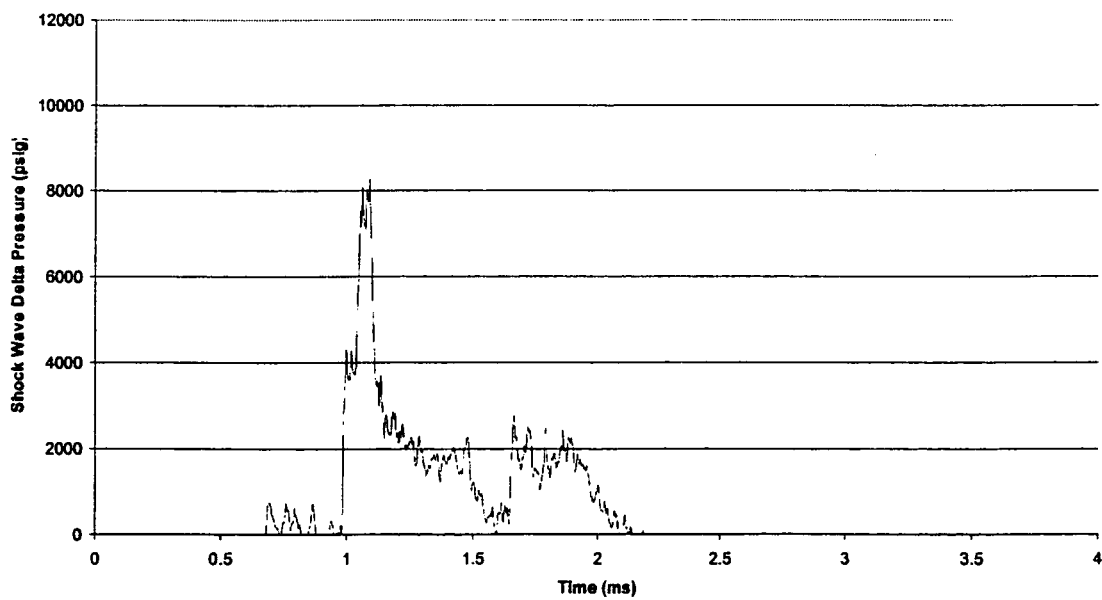
FIG. 6 is a graphical representation of a typical pressure wave at the manifold rupture disk pursuant to the operation of the gas generator of the present invention.

FIG. 6 illustrates graphically the pressure wave measured at the manifold rupture disk. The pressure wave measured near the manifold is approximately 4,000 psi above the 6,000 psi fill pressure. The reflected pressure wave increases to approximately 8,000 psi above the fill pressure of the gas mixture in the pressure vessel. Since the total pressure at the manifold rupture disk is approximately 14,000 psi, which exceeds the design pressure of 11,000 psi of the manifold rupture disk, the manifold rupture disk ruptures to release gas into the test tank (inflator or other device to be inflated or pressurized).

While the invention has been described in connection with what is presently considered to be the most practical preferred embodiments, it is to be understood that the invention is not limited to the disclosed embodiments, but on the contrary, is intended to cover various modifications and equivalent arrangements included within the spirit and scope of the appended claims.

What is claimed is:

1. A method of generating gas for a device to be inflated or pressurized, comprising:

providing a pressure vessel containing a gas under a first predetermined pressure;

providing an initiator housing closing one end of said pressure vessel and having an opening at the inner end thereof closed by an initiator rupture disk constructed to rupture at a second predetermined pressure in said initiator housing greater than said first predetermined pressure;

said second predetermined pressure being sufficient to create a pressure wave that travels through said pressure vessel;

providing a micro-gas generator or initiator within said initiator housing;

providing a manifold closing the other end of said pressure vessel, said manifold having an opening at the inner end thereof closed by a manifold rupture disk constructed to rupture at a third predetermined pressure greater than said first predetermined pressure, said manifold rupture disk being directly exposed to the interior of said pressure vessel in the path of said pressure wave; and firing said micro-gas generator or initiator to increase the gas pressure in said initiator housing to a value equal to or exceeding said second predetermined pressure to rupture said initiator rupture disk and create said pressure wave that travels through said pressure vessel to impinge on said manifold rupture disk and create a localized pressure at said manifold rupture disk that equals or exceeds said third predetermined pressure to rupture said manifold rupture disk and allow flow of gas through said manifold before the gas in said pressure vessel is significantly heated and pressurized by the gas flow from said initiator housing;

wherein the flow of gas through said manifold upon rupture of said manifold rupture disk is at a temperature of less than approximately 21° C.

* * * * *